March 15, 1966 W. S. KAPNEK ETAL 3,240,364

AUTOMOBILE PARKING INSTALLATION

Filed Feb. 6, 1964 7 Sheets-Sheet 1

INVENTORS
WILLIAM S. KAPNEK
MARK MORTON
BY
Caesar and Rivise
ATTORNEYS.

*INVENTORS*
WILLIAM S. KAPNEK
MARK MORTON
*BY*
*Caesar and Rivise*
ATTORNEYS.

March 15, 1966 W. S. KAPNEK ETAL 3,240,364

AUTOMOBILE PARKING INSTALLATION

Filed Feb. 6, 1964 7 Sheets-Sheet 3

INVENTORS
WILLIAM KAPNEK
MARK MORTON

BY *Caesar and Rivise*

ATTORNEYS

AUTOMOBILE PARKING INSTALLATION

INVENTORS
WILLIAM KAPNEK
MARK MORTON
BY
Caesar and Rivise
ATTORNEYS.

AUTOMOBILE PARKING INSTALLATION

Filed Feb. 6, 1964 7 Sheets-Sheet 5

INVENTORS
WILLIAM KAPNEK
MARK MORTON
BY
Caesar and Rivise
ATTORNEYS.

INVENTORS
WILLIAM S. KAPNEK
MARK MORTON
BY
Caesar and Rivise
ATTORNEYS.

March 15, 1966 W. S. KAPNEK ETAL 3,240,364

AUTOMOBILE PARKING INSTALLATION

Filed Feb. 6, 1964 7 Sheets-Sheet 7

INVENTORS
WILLIAM S. KAPNEK
MARK MORTON
BY
Caesar and Rivise
ATTORNEYS.

3,240,364
AUTOMOBILE PARKING INSTALLATION

William S. Kapnek, 3717 Chestnut St., and Mark Morton, 935 E. Wadsworth Ave., both of Philadelphia, Pa.
Filed Feb. 6, 1964, Ser. No. 343,920
12 Claims. (Cl. 214—16.1)

This invention relates to a parking installation for automobiles and the like, and it more particularly relates to an enclosed parking installation of the aforesaid type. This application is a continuation-in-part of application Serial No. 861,285, filed December 22, 1959, now abandoned, which in turn is a continuation-in-part of application Serial No.707,309, filed January 6, 1958 and now abandoned.

The use of specially constructed buildings for parking automobiles has become very widespread especially in congested city areas. Such buildings are especially desirable in congested areas because the building can be divided into a number of stories, each story accommodating a layer of cars. This multiplies by many times the parking area available in an open lot occupying the same ground space.

One of the disadvantages of prior building-type parking installations which they shared in common with many open-lot type parking areas was the fact that the owner of the car had to surrender his car to an attendant who then had to drive the car to a parking space somewhere in the building. Since attendants were not always sufficiently careful, there were many incidents of damage to cars.

Furthermore, the owner, when surrendering his car to an attendant had to leave the car open and if he had any possessions in it, he had to depend on the honesty of any one in the building who had access to his car.

Another disadvantage of prior installations was the necessity for erecting entirely new buildings, since the specially designed handling equipment thereof required a building of special design.

Another disadvantageous factor encountered heretofore was the necessity of using many attendants in order to service a large number of cars. This was not only expensive for the operator of the parking installation but there was often insufficient maneuvering space for the number of cars which had to be moved about; consequently, some attendants always had to wait for others to get out of the way before performing their own duties. This obviously resulted in annoying delays for the customers and waste of time and labor for the parking building operator.

In order to overcome the aforesaid difficulties, parking buildings were constructed which utilized conveyors, movable carriers, etc. for transporting the automobiles to and from individual storage areas in the building. However, none of these later adaptations adequately solved the problem because they were either so complex and expensive in construction, operation and maintenance or they were so undependable and inefficient that they proved commercially impracticable.

Most of these prior type installations had the problem of placing the cars on or removing them from the conveyors or carriers. This had to be accomplished either by driving the cars up and down ramps or the like under their own power or bodily lifting the cars by means of lift forks or the like.

The aforesaid prior type parking installations relied upon the use of a conveyor which possessed parallel transverse beams upon which the automobile was driven. When the conveyor reached the storage area where the automobile was to be deposited means were provided to shift a portion of the conveyor laterally toward the storage area. A section of the conveyor was then permitted to drop downwardly adjacent a series of parallel lateral beams which were to support the automobile in the storage area. The conveyor beams are designated as the movable beams and the storage area beams are designated as the fixed beams. The respective beams were so designed that the movable conveyor beams could pass between or intermesh with the fixed storage beams. As this occurred the weight of the automobile was shifted from the conveyor beams to the storage beams. The conveyor beams then passed under the storage beams, returned to the convey and the conveyor was then returned for transport of another automobile.

It has been found that the intermeshing operation of prior type installations caused serious operational and maintenance problems and required a complicated guidance means in order that the movable conveyor beams would pass between the fixed storage beams.

It has also been proposed to utilize lift forks for the purpose of raising an automobile to a desired storage area. The use of lift forks, however, often tended to damage the underparts of the automobile, especially in cold weather when fluid pressure valves become stuck so that the lift forks could not function properly. While it has been proposed to associate channel means with the lift forks and thereby lessen the problem of injury to the underparts of the car, the inherent disadvantages of the use of lift forks is still necessarily retained. It has even been proposed to secure protective channel means to a pallet upon which the automobile would be driven with the lift fork raising the entire assembly and positioning it in a desired storage area. However, the disadvantages of the lift fork are still inherent in such a system.

The disadvantages of a lift fork may be briefly summarized. First, the use of a lift fork is necessarily an intermittent operation since a given lift fork will obtain possession of a car and then the operator must visually locate a storage area. Where several lift forks are used, the problem is complicated by safety considerations since each lift fork is individually controlled by a particular operator and thus each operator must constantly be alert to the presence of other operators, and frequent collisions are possible. Furthermore, the use of a lift fork necessarily requires that a portion of the realty be set aside purely for the travel of the lift fork. Usually, the entire periphery of the real estate is so set aside. This is not only wasteful of the realty, but also presents safety problems since the customers of the installation and other pedestrians must constantly be alert to the possibility of the appearance of a moving lift fork. Finally, it is necessary that all storage areas be conveniently located so that the lift fork can deposit an automobile therein. This usually means that it is not possible to set up a system wherein the lift forks operate centrally but rather the lift forks will maneuver around the periphery or exterior of the building and deposit automobiles externally thereof.

It is therefore one object of the present invention to provide a parking installation which is constructed to effectively overcome the aforesaid difficulties inherent in prior type parking installations.

Another object of the present invention is to provide a parking installation of the aforesaid type which is relatively simple in construction and function and which requires little skill in the operation thereof.

Another object of the present invention is to provide a parking installation of the aforesaid type wherein there will be no danger of damage of the cars being parked.

Another object of the present invention is to provide a parking installation of the aforesaid type which is operated with a minimum of efficiency and minimum of waste and delay.

Another object of the present invention is to be able to utilize existing buildings by merely installing supports and tracks where necessary, all other mechanisms being on the carriers themselves.

Yet another object of the present invention is to avoid the use of movable and fixed intermeshing beams in order to shift the weight of an automobile from a conveyor to a storage area and vice versa.

Still another object of the present invention is to utilize a pallet holding an automobile in an automated parking building with elevator shafts and central corridors and thereby overcome the disadvantages of lift forks or lift trucks.

Yet another object of the present invention is to provide a pallet of improved construction.

Other objects and many of the attendant advantages of this invention will be readily appreciated as the same becomes better understood by reference to the following detailed description when considered in connection with the accompanying drawings wherein.

Figures 2, 3:
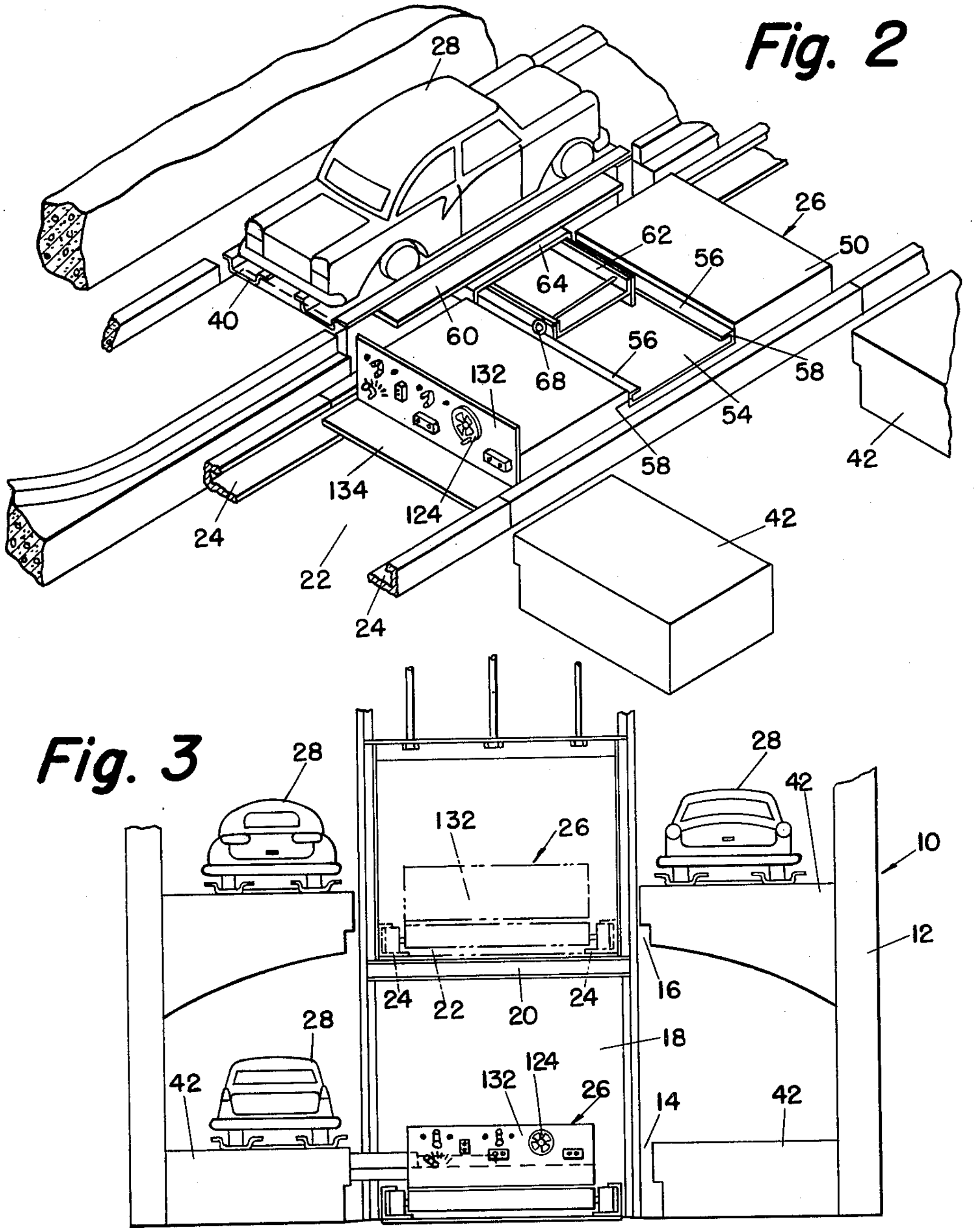
FIG. 2 is an enlarged, detailed perspective view of a carriage shown depositing a car on a storage platform.
FIG. 3 is a front elevational view of a portion of the installation shown in FIG. 1.

Referring in greater detail to the various figures of the drawings wherein similar reference characters refer to similar parts, there is shown a parking installation, generally designated 10, comprising a building 12 having a number of floors such as are indicated at 14 and 16 of FIG. 3.

At one end of the building is an elevator shaft 18 in which is vertically movable an elevator 20. This elevator 20 is adapted to hold an automobile or similar vehicle and is also adapted to stop level with each floor of the building. The elevator shaft is arranged to coincide with a central corridor 22 on each floor, each of these central corridors being defined by oppositely disposed guide channels 24 for receiving the wheels of a carrier generally designated 26.

Figures 1, 15:
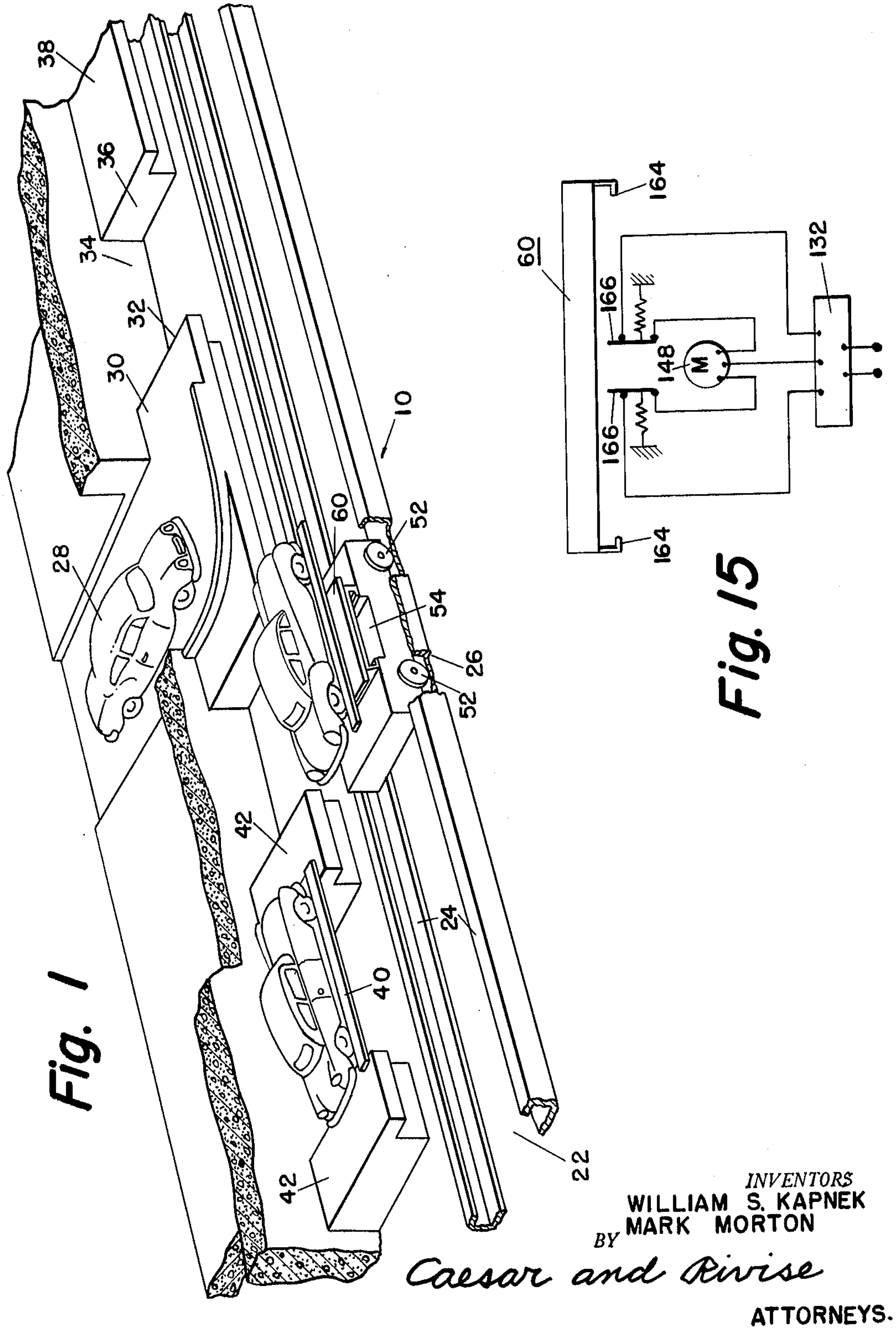
FIG. 1 is a fragmentary perspective view of a parking installation embodying the present invention.
FIG. 15 is a somewhat schematic view of the limit stop arrangement.

In the operation of the system, a vehicle, such as illustrated at 28, is driven into the building along the ramp 30 (FIG. 1). This ramp 30 ends at an edge 32 which defines one side of a deposit area 34, the opposite side of this area being defined by an edge 36 of a platform 38. Positioned in this deposit area 34 with its ends overlapping the edges 32 and 36 is a pallet such as illustrated at 40 in FIG. 14.

The car 28 is driven onto the pallet 40 which spans the area 34. The owner then puts on the brakes, leaves the car and locks it. The pallet and car are then bodily lifted onto the carrier 26 by laterally movable means associated with the carrier. The carrier 26, with the pallet and car thereon, is then moved to a position adjacent an appropriate storage area defined by spaced platforms comprised of opposed walls having tops 42 where the pallet and car are deposited (as illustrated in FIG. 1) by the same laterally movable means. If the storage area is on another floor of the building, the carrier is driven onto the elevator 20 which is then moved to the appropriate floor. The carrier is then driven off the elevator and to the appropriate storage area where it is deposited. In delivering the car back to its owner, the reverse procedure is followed, and the car, after being deposited in area 34, is driven away on platform 38 to an exit (not shown).

Figures 10, 11, 12, 13, 14:
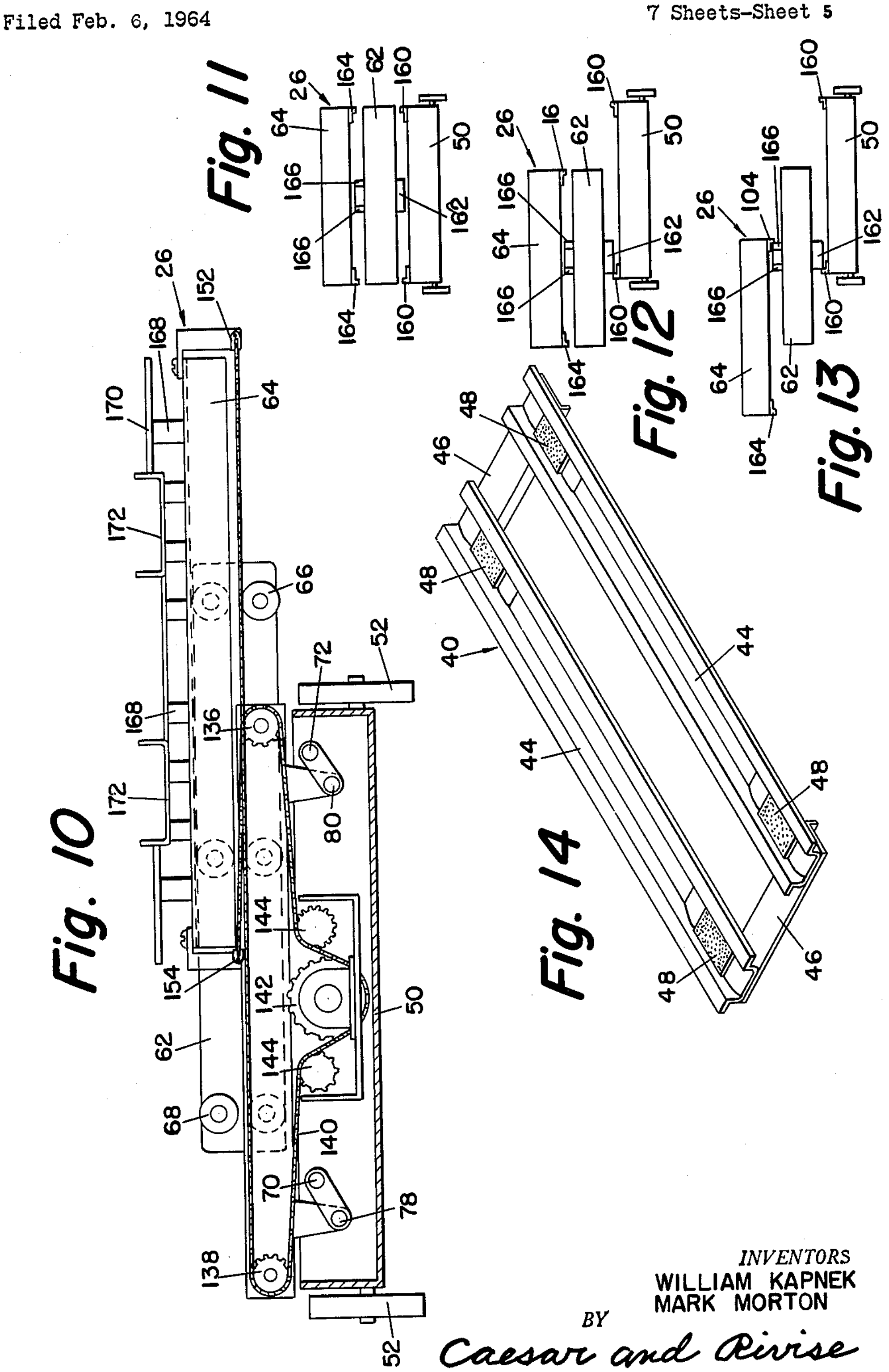
FIG. 10 is a sectional view taken on line 10—10 of FIG. 4, the two upper parts of the carriage being here shown relatively displaced from each other for illustrative purposes although such displacement, when in operation, only takes place when both upper parts are displaced relative to the lower part.
FIG. 11 is a somewhat diagrammatic view of the carriage in neutral position.
FIG. 12 is a view similar to FIG. 11 but showing the carriage in partially extended position.
FIG. 13 is a view similar to FIGS. 11 and 12 but showing the carriage in fully extended position.
FIG. 14 is a perspective view of one embodiment of the pallet forming a portion of the present invention.

The pallet 40, as shown in detail in FIG. 14, comprises a pair of oppositely disposed, spaced, parallel channel tracks 44 for receiving the opposite wheels of the vehicle. These tracks 44 are connected by oppositely disposed end straps 46. Stops 48 are provided at the opposite ends of each track 44.

The above-described pallet construction provides a relatively light-weight, efficient type of device. However, the present invention is not limited to the use of this type of pallet since various other types may also be used. The pallet of FIGS. 16 to 22 is an advanced pallet which may also be used with and forms a part of the present invention.

The pallet may be a flat plate or plank without any tracks or inner cut-out portion. Such a solid plate, although not as light as the pallet shown at 40, would be somewhat easier to use since it would not be necessary to accurately align the wheels of the vehicle to fit into the channel tracks. It would also be easier and less expensive to manufacture. Preferably, however, such flat plate would be provided with longitudinal guard rails along either side to prevent the vehicle from accidentally falling off.

Figure 4:
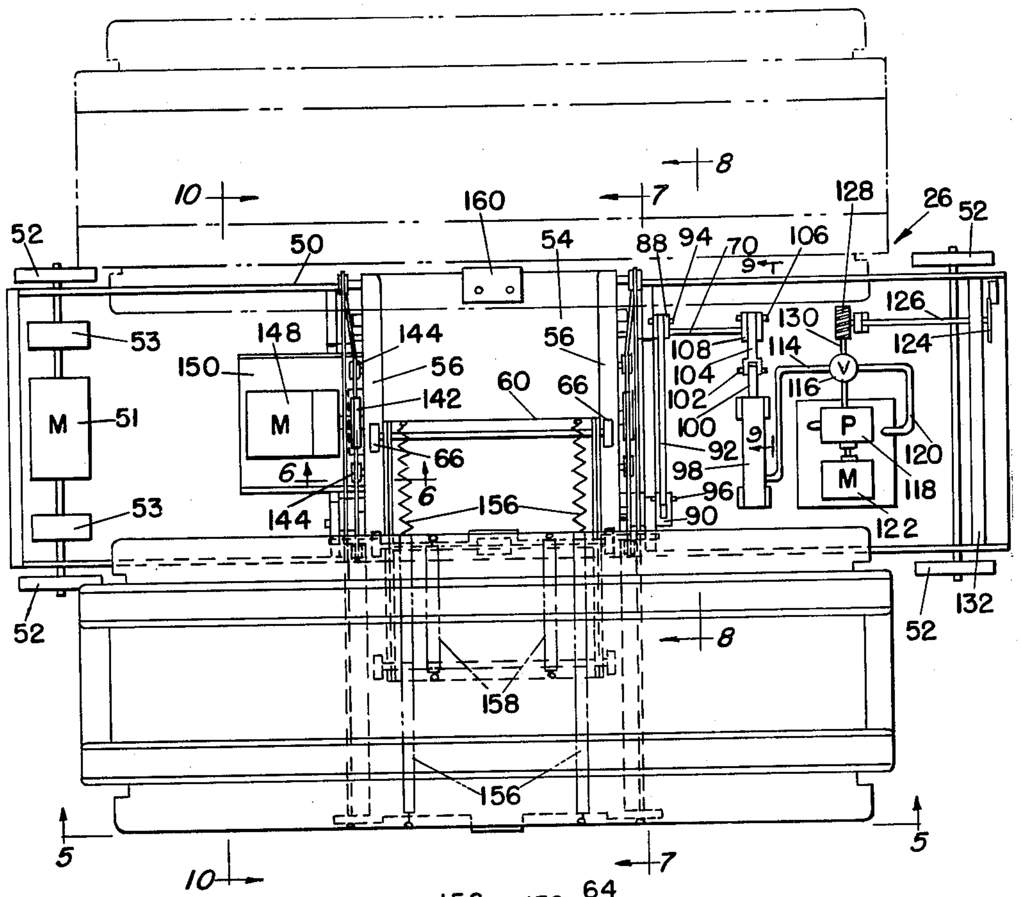
FIG. 4 is a top plan view of a carrier assembly embodying the present invention.

In order to carry out the above-described functions, there is provided a movable carrier such as has been generally designated 26. This carrier 26 comprises as shown in FIG. 4 a base 50 mounted on wheels 52 and driven by a motor 51 through reduction gearing 53. Instead of a motor such as shown at 51, an electrical drive system utilizing trolley wires or third rails may be used. The base 50 is further provided with a central transverse recess 54 defined by laterally spaced, parallel tracks 56 (FIG. 5) extending inwardly of walls 58.

A pallet supporting carriage 60 is vertically and transversely movable on the carrier base 50, this carriage being guided in its transverse movement by the recess 54.

Figure 5:
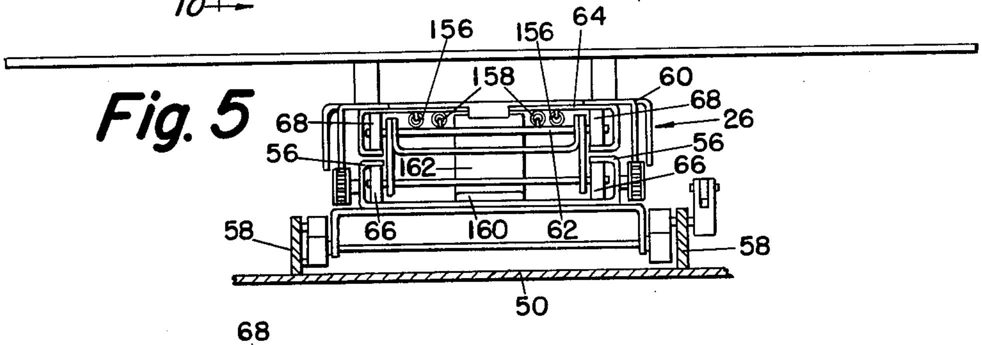
FIG. 5 is an elevational view taken on line 5—5 of FIG. 4.
Figure 6:
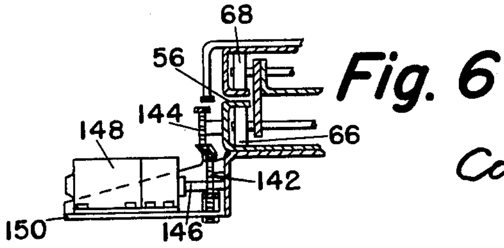
FIG. 6 is a sectional view taken on line 6—6 of FIG. 4.
Figure 7:
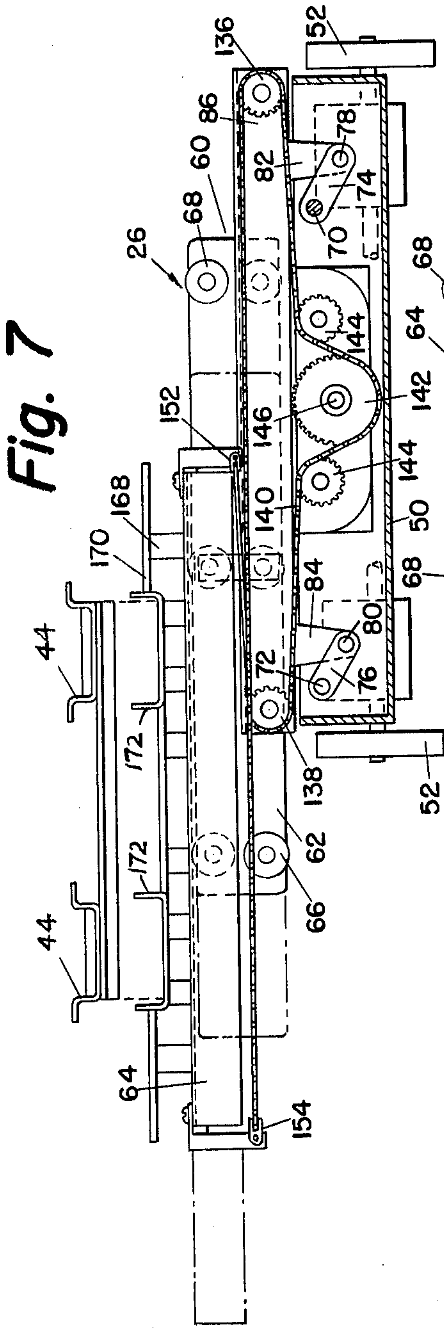
FIG. 7 is a sectional view taken on line 7—7 of FIG. 4.

The carriage 60 (FIG. 5) comprises two relatively movable platforms 62 and 64, the upper platform 64 (FIG. 11) overlying the platform 62. The lower platform 62 is provided with two sets of rollers (FIG. 5) indicated respectively at 66 and 68. The rollers 66 move along the undersurfaces of tracks 56 while the rollers 68 move along the upper surfaces of these tracks as shown in FIG. 2. In addition, the platform 64 slides over the rollers 68 (as best seen in FIG. 5). The entire carriage 60 is also vertically movable (FIG. 9) relative to the base 50.

The vertical movement of the carriage 60 is obtained by means of parallel linkage best shown in FIGS. 4 and 7 to 10. It is this vertical movement which enables the carriage 60 to move under a pallet and then lift it, or deposit a pallet and then move away from it.

The aforesaid linkage includes a pair of oppositely disposed shafts 70 and 72 (FIG. 7) positioned in bearings in the corresponding wall 58.

Figure 8:
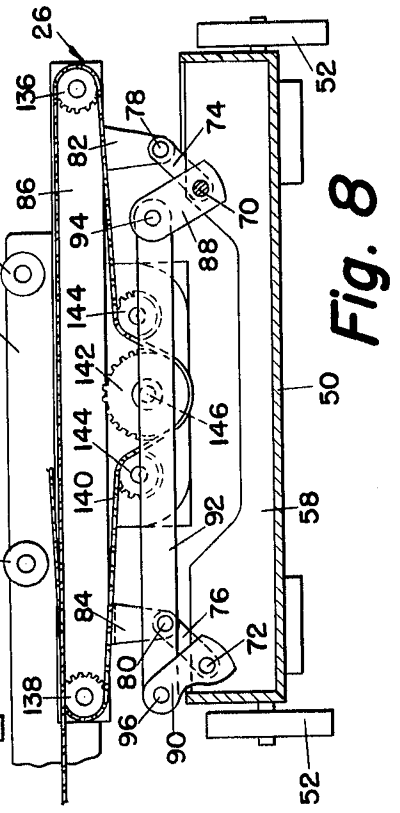
FIG. 8 is a sectional view taken on line 8—8 of FIG. 4.

Mounted on the shafts 70 and 72 for pivotal movement corresponding to the rotation of shafts 70 and 72 are crank arms respectively designated 74 and 76. These arms 74 and 76 are respectively pivoted, as at 78 and 80, to corresponding hangers 82 and 84 depending from a support 86. Also mounted on shafts 70 and 72 for pivotal movement corresponding to rotation of said shaft are respective links 88 and 90 (FIG. 8). Between the links 88 and 90 extends a bar 92 which is pivoted to the links 88 and 90 at 94 and 96 respectively.

Figure 9:
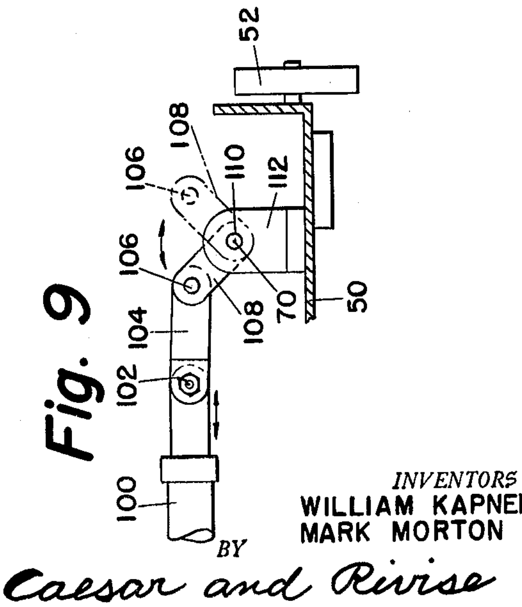
FIG. 9 is a fragmentary sectional view taken on line 9—9 of FIG. 4.

The linkage is actuated to move the carriage up (as in FIG. 8) to pick up a pallet or down (as in FIG. 7) to deposit a pallet by means of a fluid pressure system best shown in FIGS. 4 and 9. This fluid pressure system (which may be either hydraulic or pneumatic) includes a cylinder 98 having a piston head therein (not shown). This piston head is provided with a piston rod 100 to the free end of which is pivotally connected, as at 102 (FIG. 9), a link 104. The link 104 is, in turn, pivotally connected to a pin 106 to which is pivoted a link 108. The link 108 is connected at 110 to shaft 70 which extends through an apertured bearing lug 112 on the base 50.

The piston in the cylinder 98 is controlled through a conduit 114 (FIG. 4) extending from a position behind the piston head in the cylinder to a valve 116. The valve 116 is connected to a pump 118 by means of conduit 120. The pump is connected to a source of fluid pressure (not shown) and is actuated by a motor 122.

The piston actuates the above-described linkage by means of its own longitudinal movement. This longitudinal movement of the piston acts to rock the link 108 which then rotates the shaft 70. The shaft 70 thereupon acts to rock the links 74, 76 and the links 88, 90 in the direction corresponding to the rotation of the shaft 70.

The valve 116 is operated by a manually operable wheel 124 through a shaft 126 operatively connected to gearing 128 associated with the valve shaft 130. The wheel 124 is mounted on a control panel 132 adjacent the rear edge of the carrier 26. This control panel is set in far enough from the edge of the carrier to provide a platform 134 (as best seen in FIG. 2) upon which the operator may ride while he controls the carrier.

The fluid pressure system illustrated contains only a conduit leading to the rear of the piston in the cylinder 98. Only one such conduit is necessary since, when the pressure is released from behind the piston, the weight of the carriage and its associated parts will be sufficient to press down on the parallel linkage to bring the carriage back to its downward position. However, if desired, a conduit from an appropriate three-way valve may be provided at either end of the cylinder 98 in order to effect positive fluid pressure action and exhaust in either direction of piston movement. It is also possible to use the single conduit system illustrated and provide a spring forwardly of the piston head to bias it rearwardly when no pressure fluid is applied.

The two platforms 62 and 64 are movable laterally relative to each other (FIGS. 11, 12 and 13) as well as to the remainder of the carrier by means of a chain and sprocket system (best shown in FIGS. 6, 7, 9 and 10). Since this mechanism on each side of the carriage is identical, only one side will here be described in detail.

The chain and sprocket system includes a pair of sprockets 136 and 138 (FIG. 7) mounted at opposite ends of the support 86. A chain 140 extends over the sprockets and also extends around a drive sprocket 142 (FIG. 8) and two idler sprockets 144. The drive sprocket is mounted on a shaft 146 extending from a reversible motor 148 (FIG. 6) supported on a motor-mounting plate 150. The idler sprockets are supported on shafts extending out from the mounting plate support means.

One end of the chain 140 is connected to one end of the upper platform 64, as indicated at 152 (FIGS. 7 and 10) and the other end of the chain is connected to the opposite end of the platform 64, as indicated at 154. The upper platform 64 is itself connected to the lower platform 62 by springs 156 and 158 (note FIGS. 4 and 5). These springs are strong enough to normally permit both platforms 62 and 64 to move together under the driving action of the chain and sprocket system in either direction. In the neutral position of the carriage, both springs are under slight but equal and opposite tensions serving to counterbalance each other.

The base 50 is provided with a stop 160 at each end, these stops being adapted to coact with a lug 162 depending from the platform 62 (note FIGS. 5, 11, 12 and 13). When this lug contacts either one or the other of the stops 160, the motion of the platform 62 is halted, but the platform 64 continues to move, stretching one set of springs and collapsing the other, until one of the contacts 164, there being one at each end of the platform 64, engages the corresponding switch 166 extending upwardly from the platform 62.

The switches 166 are normally spring-biased into closed position (as illustrated in FIG. 15). Each switch 166 is connected in circuit with the reversible motor 148 through control panel 132 so that when the switch is opened by engagement with the corresponding contact 164, the motor is de-energized for movement of the carriage in the corresponding direction but remains energized for movement in the opposite direction. As soon as the contact disengages the switch, however, the spring immediately moves it back into closed position. The motor 148 is actuated for reverse motion by means of appropriate control means on the board 132.

In operation, a vehicle 28 is driven onto a pallet in the area 34 (FIG. 1). The brakes are then applied and the car locked. A carrier 26 is then driven to a position adjacent the area 34. In this position, the operator at the control board turns the wheel 124 to apply fluid pressure behind the piston in cylinder 98. The carriage 60 may now be lifted after the platform 64 has moved laterally under the pallet.

The operator then starts the motor 148 in the appropriate direction to actuate the chains 140 to move the platform 64 under the pallet in the area 34. During this movement (FIGS. 12 and 13), the platform 62 initially moves together with the upper platform 64 and then the platform 64 continues its movement while the lower platform 62 remains stationary, as described above.

With the platform 64 now under the pallet, the carriage 60 is lifted through the action of cylinder 98. The operator then actuates the motor 148 in the reverse direction whereby the pallet and car in the raised position are brought back over the carrier. The wheel 124 is then turned to lower the pallet and vehicle onto the carrier. The carrier is then driven by automatic means to the appropriate storage area either on that floor or on another floor through use of an automatic elevator as previously described.

When in a position adjacent such storage area, the mechanism is again operated in the reverse manner as above to deposit the pallet and vehicle in the storage area. This entails raising the pallet, moving it laterally above the storage area, depositing so that its end portions are supported on platforms 42 with the platform 64 dropping below the pallet and then returning laterally to the carrier. A reverse procedure is followed in removing a pallet from a storage area.

It should be noted that the upper platform 64 is provided with a plurality of posts 168 supporting a platform 170 having guide tracks 172 constructed and arranged to receive the corresponding tracks 44 of pallet 40. Such a construction of the platform 170 is specifically adapted for use with the pallet 40. However, when the pallet is of other construction such as a flat plate or as in FIG. 16 or the like, the platform 170 will not be provided with tracks 172 since a flat surface as in FIG. 20 would suffice.

The invention has been described above in relation to individual operation of each carrier by an operator who rides along therewith. However, it is within the scope of this invention to provide a remotely controlled electrical system wherein the carriers as well as the elevators are controlled from a remote control board by a single operator. Such single-operator remote control not only saves time and labor but provides an efficient system whereby all elements are effectively coordinated.

Another embodiment of a pallet usable with the present invention is shown in FIGS. 16 to 22. The pallet 180 includes framework tracks 182 which support the tires of an automobile, and a push bar assembly 184 to prevent the automobile from rolling away.

Figures 16, 17:
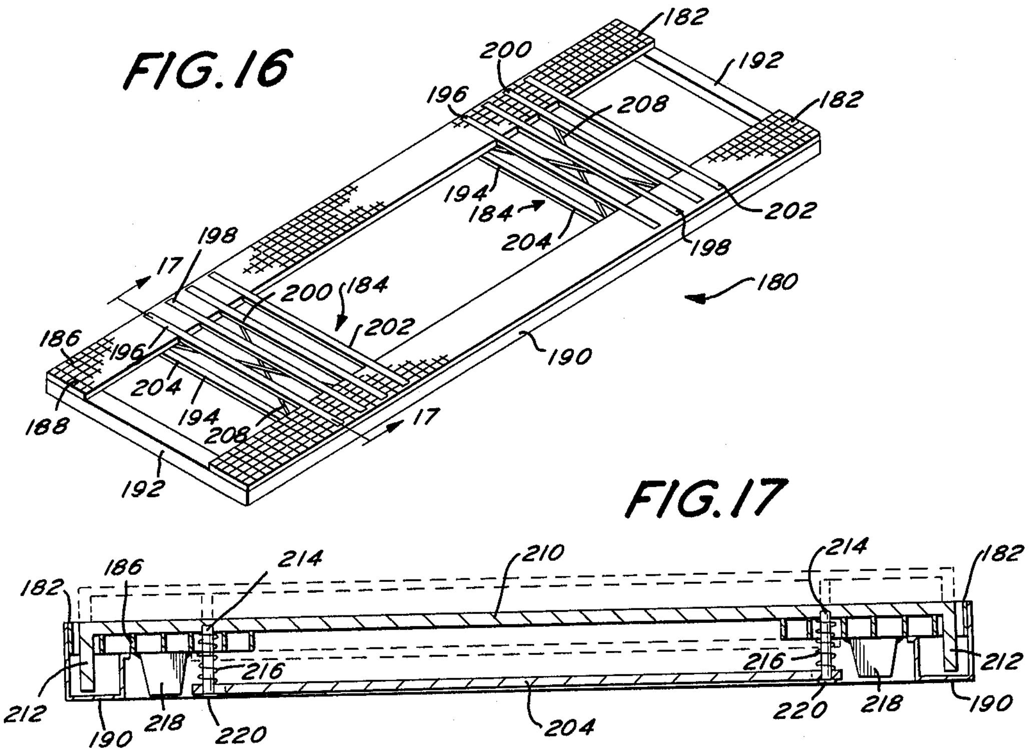
FIG. 16 is a perspective view of a second embodiment of a pallet forming a portion of the present invention.
FIG. 17 is an enlarged sectional view taken along the line 17—17 of FIG. 16 with a stop rod shown in phantom in its elevated position.

As shown in FIG. 16 the framework tracks 182 are comprised of longitudinal grilles 186 and lateral grilles 188. The framework tracks 182 are secured upon side support channels 190 which are connected to end support channels 192 that are similar in function to end straps 46 of the pallet 40. Thus, the end support channels 192 will rest upon spaced platforms 42 as shown in FIG. 1 or upon similar platforms 42 in the parking areas of FIG. 3. It is to be noted that the side support channels 190 are comprised of a channel-like material in order to permit the nesting of the legs of the stop rods as shown in FIG. 17.

Referring again to FIG. 16, two push bar assemblies 184 are preferably used with the present invention although a single push bar assembly can suffice. The push bar assembly 184, as indicated in FIGS. 16 and 18, basically comprises a rectangular frame 194 from which stop rods 196, 198, 200 and 202 may extend, and may be elevated with respect thereto.

Figure 18:
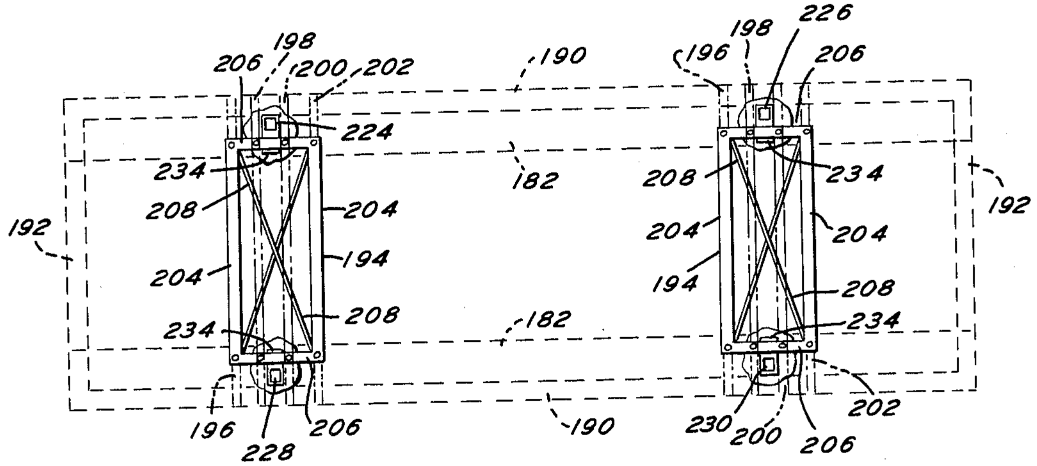
FIG. 18 is a top plan view of two push bars in operative association with the pallet of FIG. 16 with certain other portions of the pallet shown in phantom.

As shown in FIG. 18, the rectangular frame 194 is comprised of lateral arms 204 and connecting arms 206. Diagonal reinforcing arms 208 are also employed for strengthening purposes.

Figure 22:
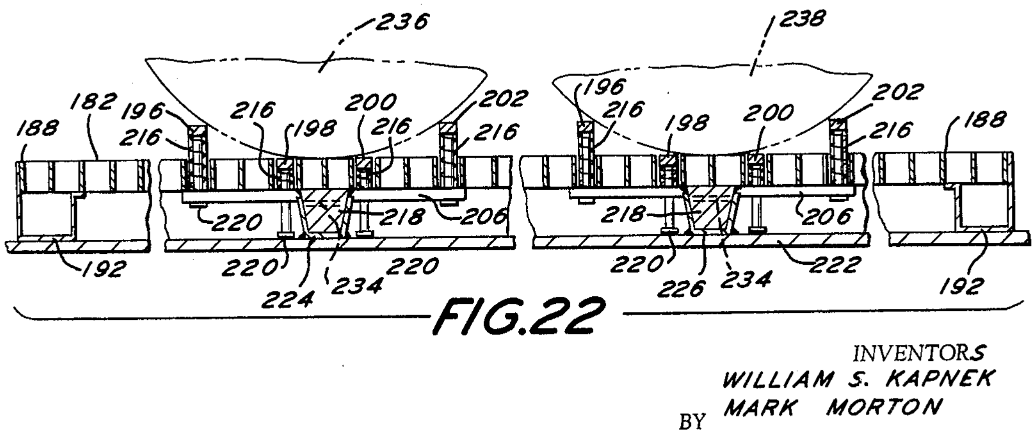
FIG. 22 is a sectional view taken along the line 22—22 of FIG. 21.

As previously stated, the stop rods 196, 198, 200 and 202 may be elevated with respect to the framework tracks 182 as illustrated in FIG. 22. Each of the stop rods, as illustrated in FIG. 17, comprises a horizontal base 210 from which end legs 212 depend with intermediate legs 214 also depending from the base 210. As further shown in FIG. 17, coil springs 216 are positioned about each of the intermediate legs 214 so as to lie between the horizontal base 210 and a connecting arm 206 of the rectangular frame as best illustrated in FIG. 22.

Figures 20, 21:
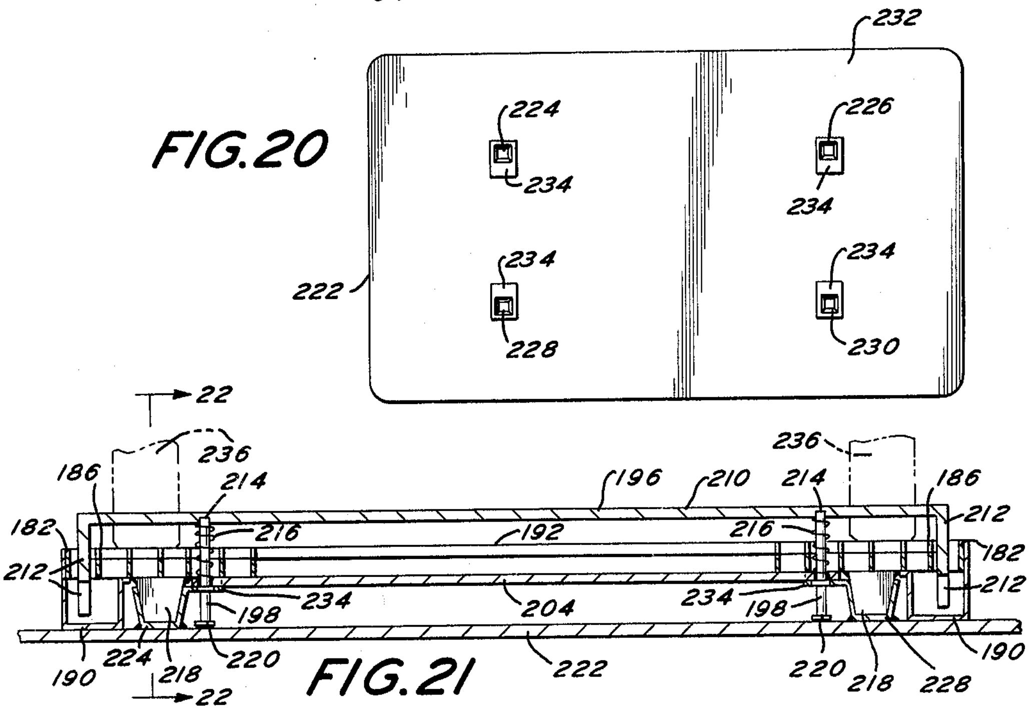
FIG. 20 is a top plan view on a reduced scale of the platform of FIG. 7 as modified to be usable with the pallet of FIG. 16.
FIG. 21 is a sectional view similar to FIG. 17 but wherein the pallet of FIG. 17 is mounted upon the platform of FIG. 20, showing fragmentary portions of automobile tires.

Referring to FIG. 17, the weight of the stop rods is such that the horizontal base 210 will lie against the framework tracks 182 so long as the rectangular frame 194 including the connecting arms 206 thereof are not elevated. However, when the connecting arms 206 are raised by the lifting up of the carriage 60, the rectangular frame 194 will also be raised as shown in FIG. 21. When this happens the stop rods 196, 198, 200 and 202 will also be raised so long as an automobile tire is not resting thereon as shown in FIG. 22. In other words, weight of the individual stop rods 196, 198, 200 and 202 is insufficient to overcome the upward force exerted by the coil springs 216. Thus, the stop rods can rise to the phantom position of FIG. 17.

It is to be further noted that four tapered lugs 218 are welded adjacent the undersurface of the framework tracks 182 as illustrated in FIGS. 17 and 18. The lugs 218 cooperate with sockets on the vertically movable platform as will be described hereinafter. It is also to be noted that the intermediate legs 214 of each of the stop rods terminate in flanges 220 which are of a width such that they cannot pass through the connecting arms 206 as illustrated in FIG. 22. The flanges 220 rather limit the upward movement of the stop rods, and also they may contact the platform 222 in the low position of the stop rods, although they are preferably slightly spaced therefrom.

Figure 19:
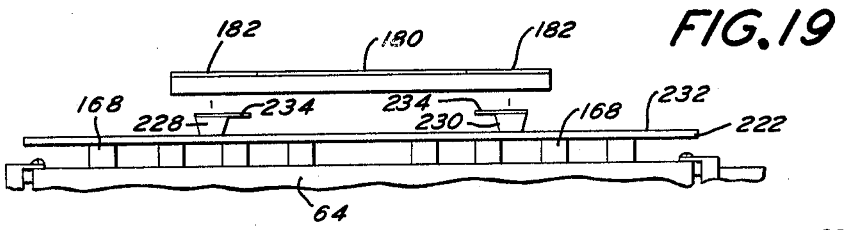
FIG. 19 is a fragmentary end elevational view similar to FIG. 7 but wherein the pallet of FIG. 16 is operatively supported in exploded view above the platform of the carrier.

The general means for raising and lowering the pallet 180 are illustrated in FIG. 19. Basically, such means comprises sockets 224, 226, 228 and 230 which are welded to the upper surface 232 of the platform 222. The platform 222 is located upon posts 168 which project from the upper vertically movable platform 64 in a manner similar to that shown in FIG. 7.

As previously discussed, the raising of the connecting arms 206 in turn carries with them the stop rods 196, 198, 200 and 202. This raising is produced by the raising of the rectangular frame 194. Such raising is accomplished by the action of flanges 234 that extend from the sockets 224, 226, 228 and 230 as illustrated in FIGS. 19, 20 and 21. As illustrated in FIG. 18, the flanges 234 are positioned between the stop rods 198 and 200 and engage the undersurface of the connecting arms 206. It is to be noted that the sockets 224, 226, 228 and 230 are of a tapered configuration that is complementary to the configuration of the tapered lugs 218. Thus, when the platform 222 is raised with the raising of the carriage 60 including platform 64 thereof, the sockets 224, 226, 228 and 230 interfit about their respective tapered lugs 218. Should there be a slight misalignment, the tapering nature of the lugs and the sockets is such as to correct the misalignment immediately. As the platform 64 is elevated, the flanges 234 of the sockets engage the connecting arms 206 as shown in FIG. 18 to raise the rectangular frame 194 to the position of FIG. 21.

When the rectangular frame is raised the stop rods 196, 198, 200 and 202 will rise along with it provided their path of elevation is not blocked by the tires of an automobile parked upon the pallet 180 as illustrated in FIG. 22 wherein there is shown a front tire 236 and a rear tire 238. As the connecting arm 206 is raised, the stop rods 196 and 202 also are permitted to rise and are essentially unhindered by the tires of the automobile. However, the elevation of the stop rods 198 and 200 is essentially retarded since the horizontal base of each of the rods 198 and 200 bears against the tires of the automobile. When this happens, the spring 216 is greatly compressed since the distance between the horizontal base 210 of the stop rods 198 and 200 and the connecting arm 206 is greatly shortened by the rise of the connecting arm 206.

Thus, rolling of the automobile in either the forward or rearward direction is prevented by means of the elevated stop rods 196 and 202. Of course, a greater number of stop rods may be provided and it should be noted that the stop rods will automatically adjust to the distance between the automobile tires of a particular automobile. In other words, with a small automobile perhaps only stop rod 196 of one rectangular frame and 202 of the other rectangular frame will be depressed. With larger automobiles the intermediate stop rods will be depressed as shown in FIG. 22.

It is thus seen that the present invention provides a parking installation which is relatively simple in design and operation and also low in maintenance.

The parking installation of the present invention does not suffer the disadvantages of the complications of the intermeshing movable and fixed beams of prior installations in shifting the weight of the automobile to and from the carrier or storage area. Furthermore, with the present apparatus, it is possible to utilize pallets in a highly automated system, and to eliminate reliance upon lift forks all together.

A particular advantage conveyed by the present invention is its adaptability to existing buildings irrespective of whether they were previously utilized for parking. This is because the present invention may rely upon a skeleton system of beams as forming the end supports upon which the pallet is deposited. Hence, an existing building can be dismembered to the extent necessary to expose existing beams, and then any additional beams which are needed are added. This is a far simpler technique from employing a system of intermeshing beams with its complicated cantilever system of supports that requires a special design. In view of the aforesaid advantages of the present invention, it is possible to convert the upper floors of an existing building into a parking area with the retention of offices in the lower floors and stores or other ground floor value.

Finally, the improved pallet of FIGS. 16 to 22 presents advantages of safety since the stop rods thereof are automatically elevated whenever the rectangular frame 194 is elevated as when the pallet is about to be picked up by the carriage 60. When this occurs any stop rods not blocked by the tires of the automobile will rise when the carriage 60 moves upwardly. In this connection the stop rods will be so spaced from each other that at least one stop rod will rise ahead of the front wheels and behind the rear wheels.

In view of the foregoing constructions, the present invention provides a parking installation which is economical and safe. This is especially surprising in view of the considerably greater speeds at which the present parking installation can be operated. This in part devolves from the utilization of pallets in the applicants' automatic system. Heretofore, previous automatic systems utilized intermeshing beams which was an operation that had to be carefully guided and thus had to be conducted at relatively low speeds. Furthermore, maintenance problems in the aforesaid system were considerable since it was necessary to employ a sophisticated guidance system.

With the present invention, however, the picking up or depositing of cars can proceed with considerable speed and also a high degree of safety, and all of this can be done at great economy in view of the relative simplicity of the basic components of the present invention.

Finally, the present invention has been described in terms of the carrier moving in corridors slightly greater in width than the short dimension of the pallet with the pallet then being shifted laterally. With the present invention it is possible to have the carrier move laterally down a corridor of a width slightly greater than the length of an automobile with the automobile then being shifted longitudinally into a storage area. For instance, in the first suggested arrangement, the corridor would be approximately 7 feet wide with each storage area being approximately 7 feet wide and 21 feet long. In the second arrangement, the corridor would be 21 feet wide and each storage area would be 21 feet wide and 7 feet long. Thus, it is readily apparent that the present invention is adaptable to buildings of varying configurations. For instance, where the building is so constructed that the parking is most efficiently done in a long, narrow area, the corridors would be about 7 feet wide with the automobile being shifted laterally to a storage area. However, in other existing buildings it may be more efficient for the car to be handled in a lateral disposition in a 21-foot wide corridor with the car then being deposited longitudinally into a storage area.

In either case the present parking installation is of a simplicity that the aforesaid choice of parking techniques is available. However, the cantilever support member of the intermeshing beam construction is such that it probably would not be practical to shift cars longitudinally to and from a storage area.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A parking installation comprising a building having a plurality of floors, an elevator shaft connecting the floors with each other, an elevator in said elevator shaft, a corridor on each floor in alignment with an opening leading into said elevator shaft, a series of storage areas arranged on opposite sides of each corridor on each floor, each storage area comprising an open space defined by opposed walls, an entrance ramp on one of said floors, said entrance ramp leading to a loading area adjacent a corridor, said loading area comprising a space defined by opposed walls, an exit ramp leading away from said loading area on the opposite side of said entrance ramp, at least one carrier movable through said corridors and in said elevator, said carrier having a vertically and transversely movable carriage section movable in opposite transverse directions, means for moving said carriage section, and a pallet constructed to support a vehicle thereon, said pallet being bodily movable onto and off said loading area and onto and off a selected storage area by said carriage section on said carrier, said pallet spanning said loading area and said selected storage area when in position thereon.

2. The parking installation of claim 1 wherein said carriage section comprises a pair of relatively movable platforms, said platforms being movable horizontally and being mounted on a support means which is movable vertically, said platforms being movable transversely on opposite sides of said carrier.

3. The parking installation of claim 2 wherein said platforms comprise an upper platform and a lower platform, said platforms being initially movable together and then said upper platform being movable to an extended position beyond said lower platform.

4. A parking installation comprising a building having at least one corridor with storage areas arranged on both sides of said corridor, said storage areas each comprising a pair of spaced platforms defining an open area therebetween, at least one pallet adapted to removably span said open area with opposite ends of said pallet resting on said spaced platforms, said pallet being constructed to support a vehicle, and at least one carrier movable along said corridor and constructed to selectively bodily deposit and remove a pallet having a vehicle in stationary position thereon onto and from a storage area, said carrier being constructed to stop adjacent a storage area and being provided with a carriage, at least a part of said carriage being movable both vertically and transversely in opposite directions of said carrier to selectively move under a pallet in the storage area and lift said pallet and its contents onto said carrier as well as lift a pallet and its contents from said carrier and deposit it in the storage area, said pallet including framework tracks and a push bar assembly having stop rods projecting upwardly from a rectangular frame and being resiliently biased upon said frame whereby when said frame is elevated, said stop rods will also be elevated unless blocked by the tire of an automobile contained on said tracks.

5. The invention of claim 4 wherein said rectangular frame is elevated by means of a vertically adjustable platform elevated by a carriage associated with a carrier.

6. The invention of claim 5 wherein said platform is essentially flat with socket means positioned thereon adapted to engage complementary means projecting from said tracks, and flanges associated with said socket means, said flanges being adapted to engage and lift said rectangular frame.

7. The invention of claim 4 including four stop rods that will selectively limit the movement of the front wheels of an automobile and four other stop rods that will selectively limit the rear wheels of an automobile.

8. The parking installation of claim 1 wherein said pallet comprises framework tracks and a push bar assembly having stop rods adapted to project above said tracks, said stop rods projecting upwardly from a rectangular frame and being resiliently biased upon said frame whereby when said frame is elevated, said stop rods will also be elevated unless blocked by the tire of an automobile contained on said tracks.

9. The parking installation of claim 8 wherein said rectangular frame is elevated by means of a vertically adjustable platform elevated by a carriage associated with a carrier.

10. The parking installation of claim 9 wherein said platform is essentially flat with socket means positioned thereon adapted to engage complementary means projecting from said tracks, and flanges associated with said socket means, said flanges being adapted to engage and lift said rectangular frame.

11. The parking installation of claim 8 including four stop rods that will selectively limit the movement of the front weels of an automobile and four other stop rods that will selectively limit the rear wheels of an automobile.

12. The parking installation of claim 1 wherein said pallet is moved in a vertical direction as well as a horizontal direction when it is deposited in the storage area and removed from the storage area.

References Cited by the Examiner

UNITED STATES PATENTS

| | | | |
|---|---|---|---|
| 1,828,307 | 10/1931 | Been. | |
| 1,874,859 | 8/1932 | Been. | |
| 1,931,402 | 10/1933 | Black. | |
| 2,223,962 | 12/1940 | Mitchell. | |
| 2,647,647 | 8/1953 | Alimanestiano | 214—16.1 |
| 2,691,448 | 10/1954 | Lontz | 214—16.14 |
| 2,727,638 | 12/1955 | Sestan. | |
| 2,730,251 | 1/1956 | Shutt | 214—152 |
| 2,799,406 | 7/1957 | Alimanestiano | 214—16.1 |
| 2,804,218 | 8/1957 | Sylvester et al. | 214—16.42 X |
| 2,818,186 | 12/1957 | Sinclair. | |
| 2,913,205 | 11/1959 | Desbois | 108—56 |
| 2,973,878 | 3/1961 | Gibson | 214—730 |
| 2,975,923 | 3/1961 | Ulinski | 214—730 |
| 2,992,749 | 7/1961 | Spillios | 214—152 |
| 3,036,802 | 5/1962 | Kitchell | 108—56 |
| 3,049,247 | 8/1962 | Lemelson | 214—16.42 |
| 3,050,205 | 8/1962 | Coash et al. | 214—514 |

FOREIGN PATENTS

| | | |
|---|---|---|
| 777,989 | 7/1957 | Great Britain. |

GERALD M. FORLENZA, *Primary Examiner.*

HUGO O. SCHULZ, *Examiner.*